(12) United States Patent
Watanabe et al.

(10) Patent No.: US 6,338,358 B1
(45) Date of Patent: Jan. 15, 2002

(54) PRESSURE CONTROL APPARATUS

(75) Inventors: Tadao Watanabe; Atsushi Fujiwara, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,674

(22) Filed: Aug. 24, 2000

(30) Foreign Application Priority Data

Aug. 24, 1999 (JP) .......................................... 11-236738

(51) Int. Cl.[7] .............................................. G05D 16/20
(52) U.S. Cl. .................. 137/102; 137/487.5; 251/30.01
(58) Field of Search .............................. 137/102, 487.5; 251/30.01

(56) References Cited

U.S. PATENT DOCUMENTS

| | | | | |
|---|---|---|---|---|
| 4,951,705 A | * | 8/1990 | Carey et al. | ............. 137/487.5 |
| 4,961,441 A | * | 10/1990 | Salter | .................. 137/487.5 X |
| 6,021,799 A | * | 2/2000 | Price | ................... 137/487.5 X |

FOREIGN PATENT DOCUMENTS

JP          05-158552 A          6/1993

* cited by examiner

*Primary Examiner*—Gerald A. Michalsky
(74) *Attorney, Agent, or Firm*—Paul A. Guss

(57) ABSTRACT

Disclosed is a pressure control apparatus comprising an air-supplying solenoid-operated valve and an air-discharging solenoid-operated valve which are composed of normally closed type solenoid-operated valves respectively, a power source-monitoring circuit for detecting whether or not a power supply source is dropped to be lower than a predetermined value, a power source-compensating circuit for delaying drop of a solenoid-operated valve-driving power source for driving the air-discharging solenoid-operated valve when the power supply source is dropped, and a control circuit for deriving an OFF signal to the air-supplying solenoid-operated valve and deriving an ON signal to the air-discharging solenoid-operated valve when the power supply source is dropped.

7 Claims, 7 Drawing Sheets

PRIOR ART

PRIOR ART

PRESSURE CONTROL APPARATUS

BACKGROUND OF THE INVENTION

1. Field of the Invention

The present invention relates to a pressure control apparatus which makes it possible to control the pressure of a pressure fluid to be supplied, for example, to a fluid pressure-operated apparatus such as a cylinder.

2. Description of the Related Art

A pressure control valve concerning a conventional technique is shown in FIG. 6 (see Japanese Laid-Open Patent Publication No. 5-158552). The pressure control valve 1 includes a main valve 3 for controlling the pressure of air derived from a compressed air supply source 2 to supply the air to a fluid pressure-operated apparatus such as a cylinder (not shown) connected to the secondary side, an air-supplying solenoid-operated valve 4 for controlling the pressure to be supplied to a pilot chamber of the main valve 3, and an air-discharging solenoid-operated valve 5 for controlling the pressure of the air discharged from the pilot chamber to the outside.

The air-supplying solenoid-operated valve 4 is composed of a normally closed type solenoid-operated valve which maintains the shut off state when the electric power application is stopped. On the other hand, the air-discharging solenoid-operated valve 5 is composed of a normally open type solenoid-operated valve which maintains the open state when the electric power application is stopped.

Further, the pressure control valve 1 is provided with a pressure sensor 6 for detecting the pressure on the output side of the main valve 3, and a control circuit 7 for making control to open and close the air-supplying solenoid-operated valve 4 and the air-discharging solenoid-operated valve 5 respectively on the basis of a detection signal derived from the pressure sensor 6.

The pressure control valve 1 makes control to open and close the air-supplying solenoid-operated valve 4 and the air-discharging solenoid-operated valve 5 at a high speed respectively in accordance with a duty ratio of a pulse signal outputted from the control circuit 7 on the basis of to a difference (deviation) between the pressure on the output side and the preset pressure. Accordingly, the air, which is controlled to have a desired pressure, is outputted.

As shown in FIG. 7, Japanese Laid-Open Patent Publication No. 5-158552 described above discloses the following arrangement as another embodiment for substituting the P portion shown in FIG. 6. That is, an air-supplying solenoid-operated valve 4 and an air-discharging solenoid-operated valve 8, each of which is composed of a normally closed type solenoid-operated valve, are provided. Further, another solenoid-operated valve 9, which functions to release or maintain the secondary pressure of the main valve 3 when the power source is cut off, is arranged between the pilot chamber and the air-supplying solenoid-operated valve 4 and the air-discharging solenoid-operated valve 8.

However, the following inconvenience arises in the case of the pressure control valve 1 concerning the conventional technique in which the air-discharging solenoid-operated valve 5 as the normally open type solenoid-operated valve as shown in FIG. 6 is adopted. That is, in order to maintain a constant pilot pressure in the state of normal operation, it is necessary that the air-discharging solenoid-operated valve 5 is always in the state of electric power application. For this reason, the unillustrated solenoid coil of the air-discharging solenoid-operated valve 5 generates the heat. Further, the ambient atmosphere has a high temperature due to the heat generated by the solenoid coil. As a result, another inconvenience also arises such that any temperature drift occurs in the pressure sensor 6.

In view of the above, when the air-discharging solenoid-operated valve 8, which is the normally closed type solenoid-operated valve, is adopted in place of the normally open type solenoid-operated valve, it is necessary to provide the another solenoid-operated valve 9 to release or maintain the secondary pressure of the main valve 3 when the power source is cut off as shown in FIG. 7. It is required that the another solenoid-operated valve 9 is always in the state of electric power application in the state of normal operation. Therefore, an inconvenience arises such that the solenoid coil of the another solenoid-operated valve 9 generates the heat.

SUMMARY OF THE INVENTION

A general object of the present invention is to provide a pressure control apparatus in which a normally closed type air-discharging solenoid-operated valve is used to allow the air-discharging solenoid-operated valve to be in the ON state only when the power source is cut off, making it possible to avoid the heat generation of the air-discharging solenoid-operated valve in the state of normal operation.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The pressure control apparatus according to the present invention will be exemplified by a preferred embodiment, which will be explained in detail below with reference to the accompanying drawings.

Figure 1:
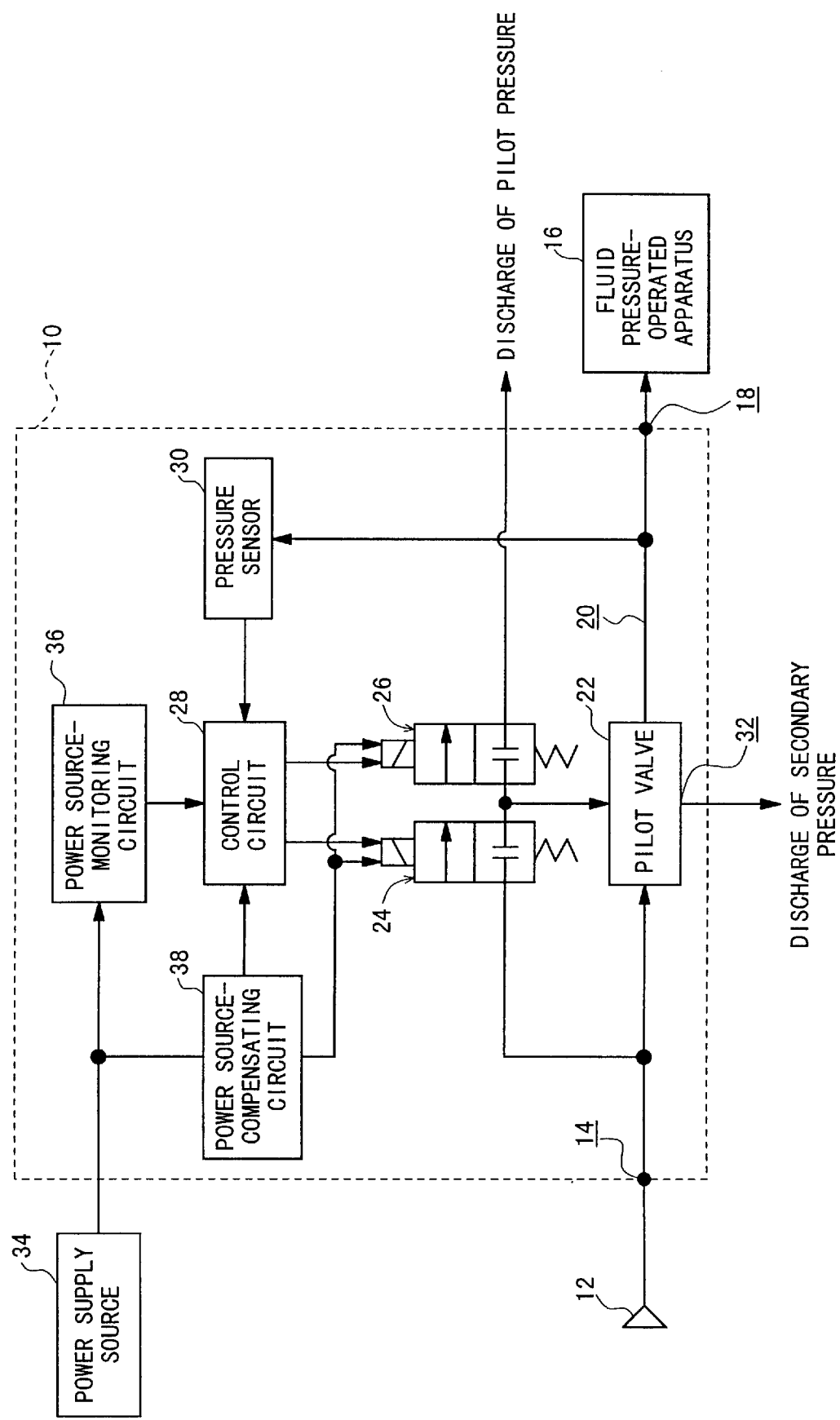
FIG. 1 shows a schematic arrangement of a pressure control apparatus according to an embodiment of the present invention.

In FIG. 1, reference numeral 10 indicates a pressure control apparatus according to an embodiment of the present invention.

The pressure control apparatus 10 includes an input port 14 to which the compressed air is supplied from an compressed air supply source 12, and an output port 18 which is connected to a fluid pressure-operated apparatus 16 such as a cylinder, for deriving the compressed air controlled to have a desired secondary pressure to the fluid pressure-operated apparatus 16.

The pressure control apparatus 10 includes a pilot valve 22 which is arranged at a communication passage 20 for making communication between the input port 14 and the output port 18 and which is provided with an unillustrated valve plug for opening/closing the communication passage 20 in accordance with the action of a supplied pilot pressure, an air-supplying solenoid-operated valve 24 and an air-discharging solenoid-operated valve 26 which are composed of normally closed type solenoid-operated valves respectively for controlling the pilot pressure to be supplied to the pilot valve 22, a control circuit (control mechanism) 28 for deriving an ON signal and an OFF signal for energizing/de-energizing the air-supplying solenoid-operated valve 24 and the air-discharging solenoid-operated valve 26 respectively, and a pressure sensor 30 for detecting the secondary pressure of the pilot valve 22 and deriving an obtained detection signal to the control circuit 28.

The pilot valve 22 is provided with a discharge port 32 which communicates with the output port 18 via an unillustrated communication passage, for discharging, to the outside, the secondary pressure to be supplied to the fluid pressure-operated apparatus 16. An unillustrated input means is connected to the control circuit 28. The preset pressure is set by the aid of an input signal introduced from the input means into the control circuit 28.

The pressure control apparatus 10 further includes a power source-monitoring circuit (power source drop-detecting mechanism) 36 for monitoring the power source (voltage or current) supplied from a power supply source 34, and a power source-compensating circuit (power source-compensating mechanism) 38 for supplying the power source from the power supply source 34 to the air-supplying solenoid-operated valve 24 and the air-discharging solenoid-operated valve 26 respectively. In the following description, explanation will be made with the voltage as an example of the power source supplied from the power supply source 34.

Figure 2:
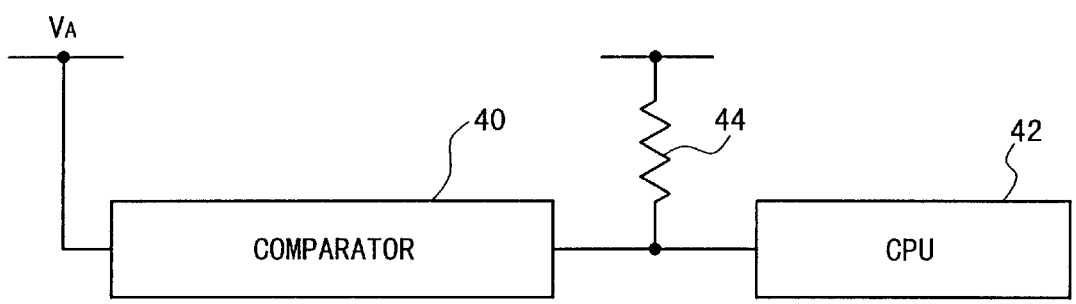
FIG. 2 shows a schematic arrangement of a power source-monitoring circuit for constructing the pressure control apparatus.

As shown in FIG. 2, the power source-monitoring circuit 36 includes a comparator 40 for making comparison to judge whether or not the applied voltage is dropped to be lower than a predetermined value. The comparator 40 functions as follows. That is, the comparator 40 outputs a high level normal signal to CPU 42 of the control circuit 28 when the applied voltage exceeds the predetermined value. On the other hand, the comparator 40 outputs a low level abnormal signal to CPU 42 of the control circuit 28 when the applied voltage is not more than the predetermined value. Reference numeral 44 indicates a resistor for pull-up.

Figure 3:
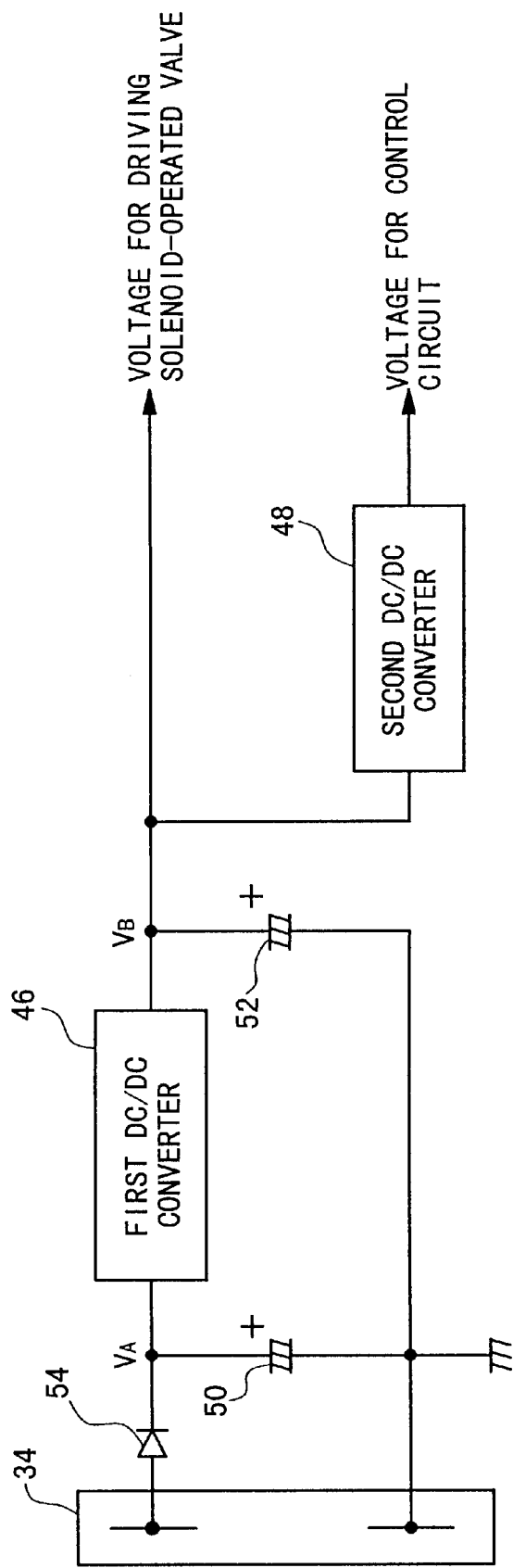
FIG. 3 shows a schematic arrangement of a power source-compensating circuit for constructing the pressure control apparatus.

As shown in FIG. 3, the power source-compensating circuit 38 includes a first DC/DC converter 46 for converting the voltage applied from the power supply source 34 into a solenoid-operated valve-driving voltage, a second DC/DC converter 48 for further converting the solenoid-operated valve-driving voltage into a CPU-driving voltage, a first electrolytic capacitor 50 which has a function to delay the drop of the voltage applied by the power supply source 34, a second electrolytic capacitor 52 which has a function to delay the drop of the solenoid-operated valve-driving voltage, and a diode 54 which has a function to avoid the electric discharge from the first and second electrolytic capacitors 50, 52 when the supply of the power source from the power supply source 34 is cut off.

The pressure control apparatus 10 according to the embodiment of the present invention is basically constructed as described above. Next, its operation, function, and effect will be explained.

The compressed air, which is supplied from the compressed air supply source 12, is introduced into the pilot valve 22 via the input port 14. In this case, the air-supplying solenoid-operated valve 24 and/or the air-discharging solenoid-operated valve 26 is subjected to ON/OFF control on the basis of the pulse signal outputted from the control circuit 28. Accordingly, the pilot pressure, which is supplied to the pilot valve 22, is controlled. Thus, the secondary pressure, which is controlled to be the pressure corresponding to the pilot pressure, is derived via the output port 18 of the pilot valve 22.

The air-supplying solenoid-operated valve 24 and the air-discharging solenoid-operated valve 26 are composed of the normally closed type solenoid-operated valves respectively, and they are in the OFF state in the ordinary situation in which unillustrated solenoid coils are not excited. The electric power is applied only in the case of the ON state brought about in accordance with the pulse signal having a predetermined cycle. Therefore, it is possible to prevent the solenoid coil from generation of heat.

The compressed air, which is controlled to have a desired pressure value, is supplied via the output port 18 to the fluid pressure-operated apparatus 16 as described above.

Figure 4:
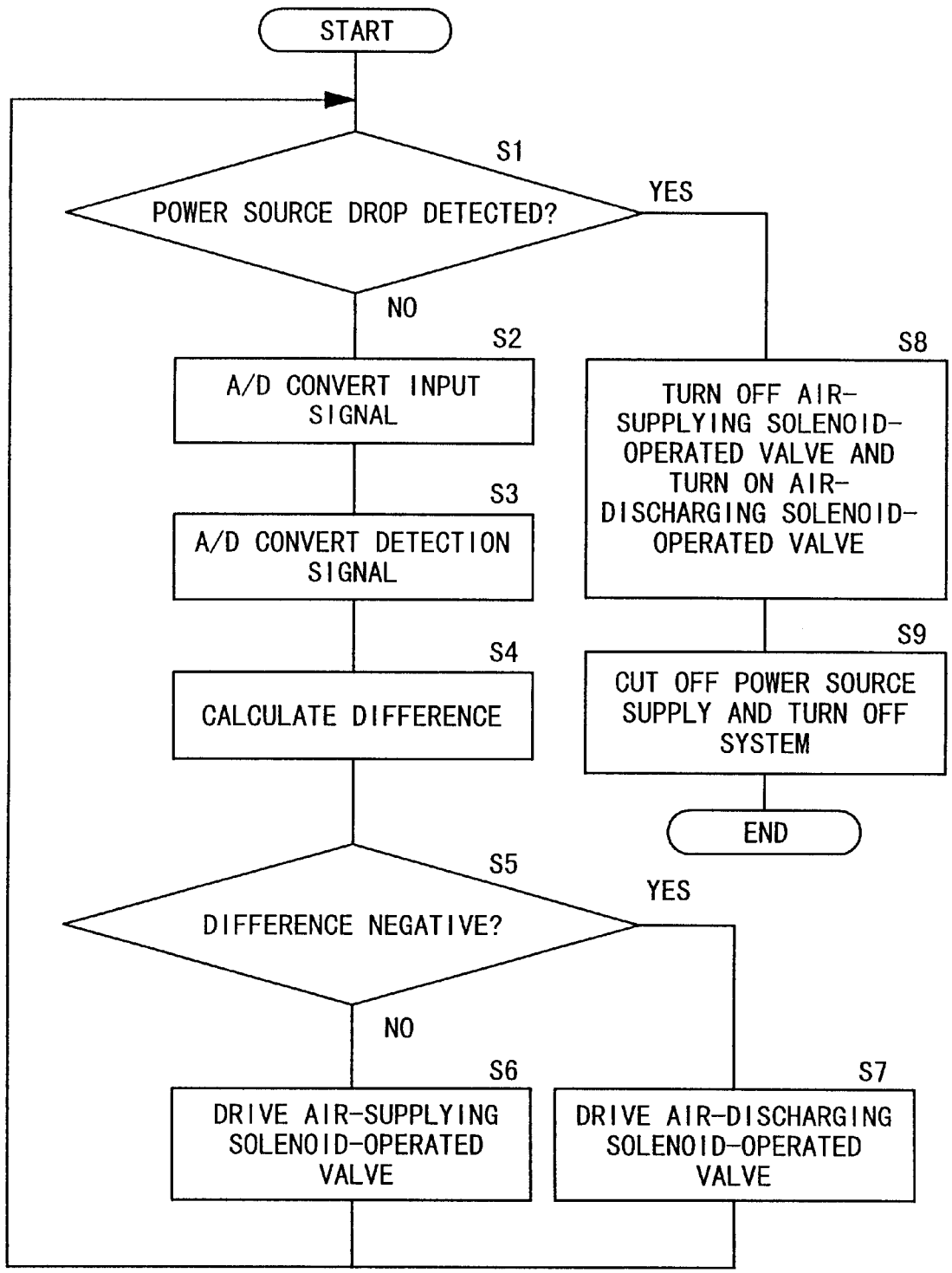
FIG. 4 shows a flow chart illustrating the operation of the pressure control apparatus.

Next, explanation will be made for the ordinary case in which the voltage applied by the power supply source 34 exceeds the predetermined value, on the basis of a flow chart shown in FIG. 4.

The comparator 40, which is provided for the power source-monitoring circuit 36, makes comparison to judge whether or not the voltage applied by the power supply source 34 drops to be lower then the predetermined value (step S1). If the applied voltage is not lowered, the routine proceeds to the step S2. That is, if the voltage applied from the power supply source 34 exceeds the predetermined value, the comparator 40 outputs the high level normal signal to CPU 42 of the control circuit 28. When the high level normal signal is inputted from the comparator 40, CPU 42 judges that the voltage applied by the power supply source 34 is not lowered, and it exceeds the predetermined value.

In the step S2, the input signal (preset pressure), which is inputted into the control circuit 28 by the unillustrated input means, is converted from the analog signal to the digital signal. Further, in the step S3, the detection signal, which is introduced from the pressure sensor 30 into the control circuit 28, is converted from the analog signal to the digital signal.

The control circuit 28, determines the difference between the input signal and the detection signal converted into the digital signals in the steps S2 and S3 described above, i.e., the difference between the preset pressure and the secondary pressure (step S4). It is judged whether the in difference is positive or negative (step S5). If the difference is positive, the driving signal for driving the air-supplying solenoid-operated valve 24 is outputted to the air-supplying solenoid-operated valve 24 (step S6). On the other hand, if the difference is negative, the driving signal for driving the air-discharging solenoid-operated valve 26 is outputted to the air-discharging solenoid-operated valve 26 (step S7). The control circuit 28 compares the detection signal with the previously set preset pressure to determine the difference therebetween. The feedback control is made so that the difference is zero.

As described above, in the ordinary case in which the power supply source 34 is not dropped, the compressed air, which is controlled to have the desired pressure, is supplied from the output port 18 to the fluid pressure-operated apparatus 16 such as the cylinder by repeatedly executing the steps S1 to S7.

Next, explanation will be made for a case in which the secondary pressure is discharged to the outside so that it becomes zero when the power supply source 34 is stopped.

When the voltage, which is applied from the power supply source 34 is cut off to be not more than the predetermined value, for example, in the case of power interruption, the comparator 40 of the power source-monitoring circuit 36 detects the fact that the applied voltage is not more than the predetermined value. The comparator 40 outputs the low level abnormal signal to CPU 42 of the control circuit 28. When the low level abnormal signal is inputted from the comparator 40, CPU 42 judges that the voltage applied by the power supply source 34 is lowered to be not more than the predetermined value.

When it is judged that the applied voltage is not more than the predetermined value, the control circuit 28 derives the OFF signal to the air-supplying solenoid-operated valve 24 to allow the air-supplying solenoid-operated valve 24 to be in the OFF state. Further, the control circuit 28 derives the ON signal to the air-discharging solenoid-operated valve 26 to allow the air-discharging solenoid-operated valve 26 to be in the ON state (step S8). When the air-supplying solenoid-operated valve 24 is in the OFF state, the supply of the pilot pressure to the pilot valve 22 is cut off. When the air-discharging solenoid-operated valve 26 is in the ON state, the pilot pressure is discharged to the outside via the air-discharging solenoid-operated valve 26. When the pilot pressure is discharged to the outside, the pilot valve 22 effects the discharge operation. The remaining secondary pressure of the pilot valve 22 is discharged to the outside via the discharge port 32 of the pilot valve 22. Accordingly, the secondary pressure becomes zero. Finally, the supply of the power supply source 34 is stopped, and the entire system is in the OFF state (step S9).

Figure 5:
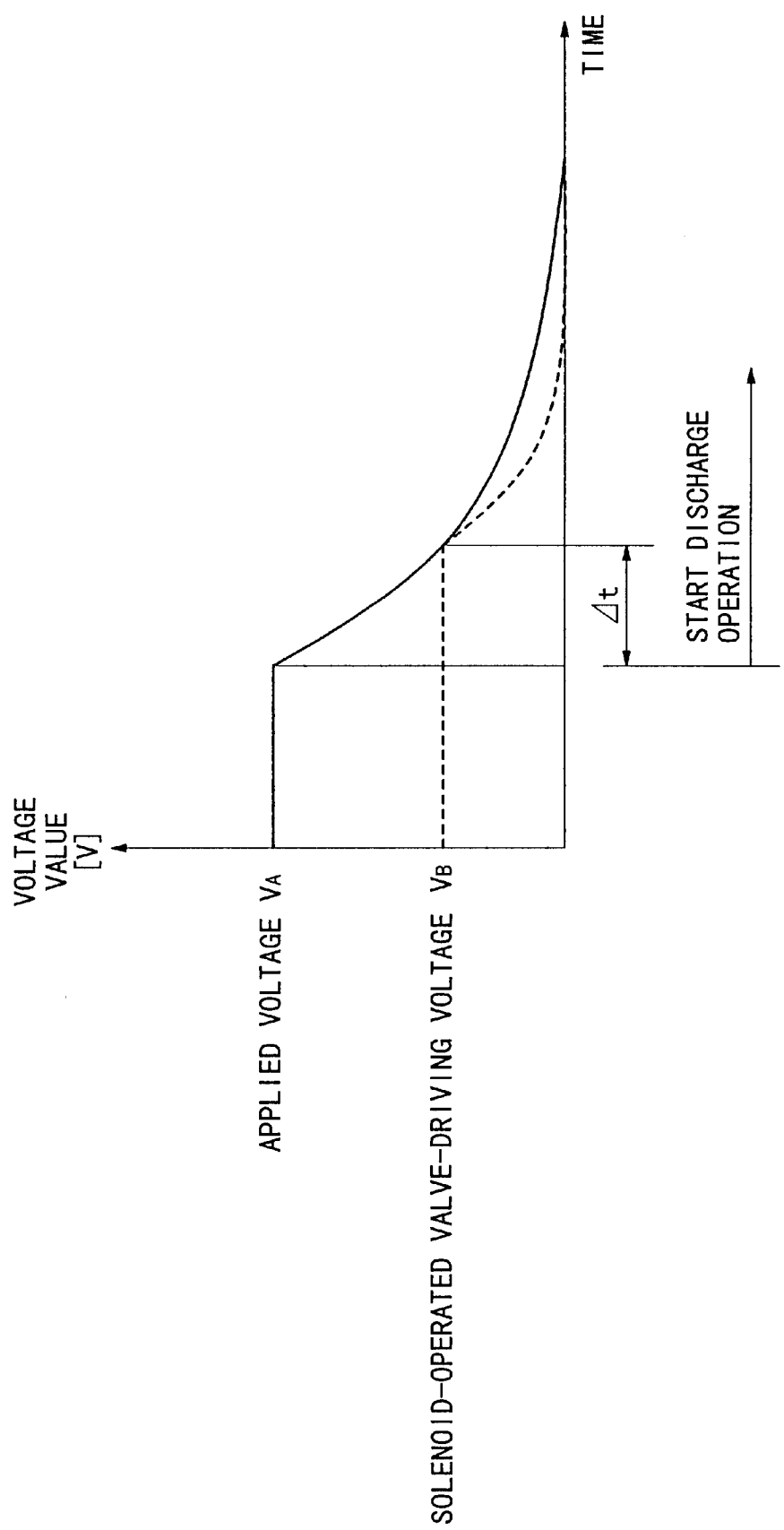
FIG. 5 shows a characteristic curve illustrating the relationship between the voltage applied from a power supply source and the voltage for driving a solenoid-operated valve.
Figure 6:
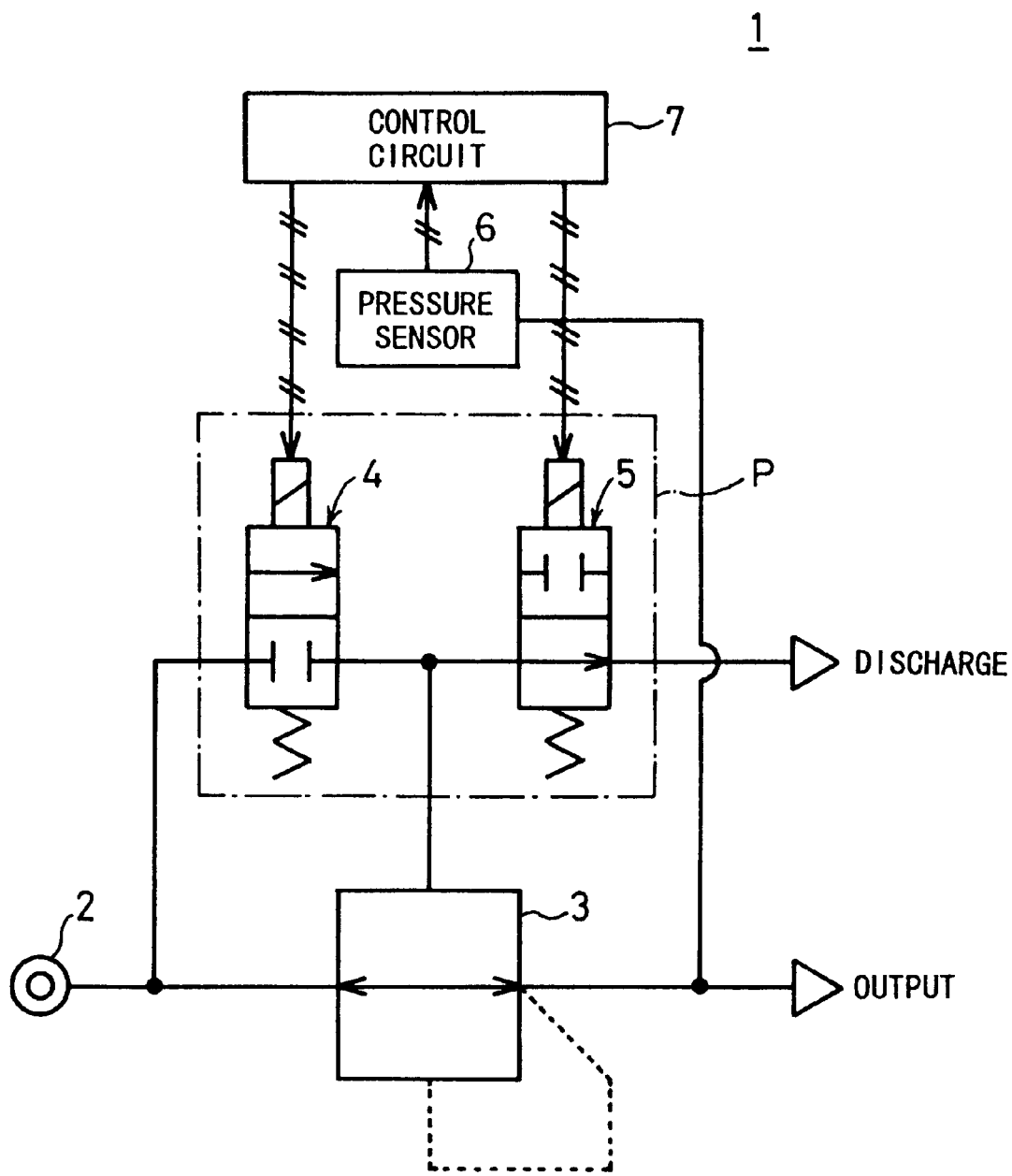
FIG. 6 shows a circuit construction of a pressure control valve concerning the conventional technique.

In this embodiment, as shown in FIG. 5, even when the applied voltage $V_A$ is cut off, the solenoid-operated valve-driving voltage $V_B$ can be maintained for a period of time $\Delta t$, because the solenoid-operated valve-driving voltage $V_B$ is set to have the voltage value which is lower than the applied voltage $V_A$, and the voltage drop is delayed by the power source-compensating circuit 38. Therefore, even when the applied voltage $V_A$ is cut off, the air-discharging solenoid-operated valve 26 can be driven for the period of time $\Delta t$.

The period of time $\Delta t$ is set to be a period of time which is sufficient for the air-discharging solenoid-operated valve 26 to make the pilot pressure to be zero and which is sufficient to make the secondary pressure of the pilot valve 22 to be zero. The air-supplying solenoid-operated valve 24 cuts off the supply pressure of the pilot pressure simultaneously with the detection of the drop of the applied voltage $V_A$.

In the embodiment of the present invention, the normally closed type solenoid-operated valves are adopted for the air-supplying solenoid-operated valve 24 and the air-discharging solenoid-operated valve 26. Further, the power source-monitoring circuit 36 and the power source-compensating circuit 38 are provided. Accordingly, the air-discharging solenoid-operated valve 26 is not always in the state of electric power application. Therefore, it is possible to avoid the heat generation of the solenoid coil of the air-discharging solenoid-operated valve 26.

Figure 7:
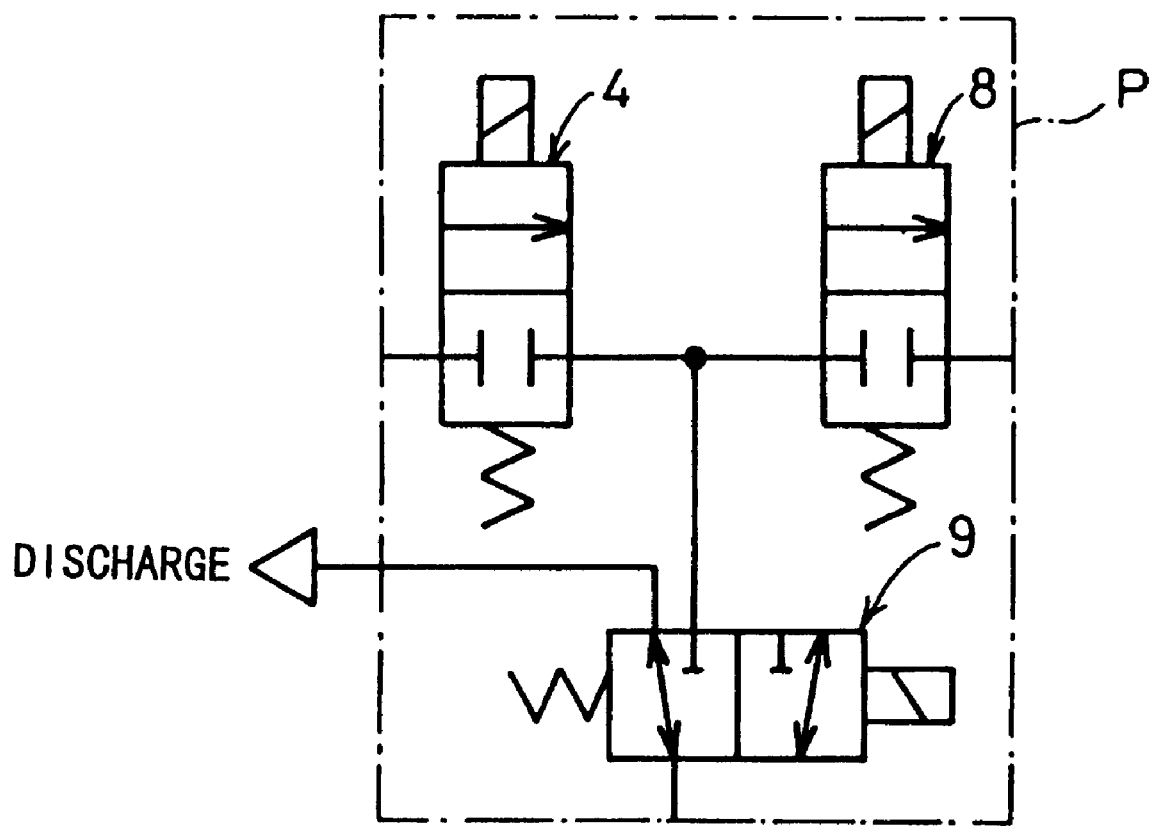
FIG. 7 shows a circuit construction illustrating another embodiment concerning the P portion shown in FIG. 6.

In the embodiment of the present invention, even when the normally closed type air-discharging solenoid-operated valve 26 is used, it is unnecessary to provide the another solenoid-operated valve 9 (see FIG. 7) unlike the conventional technique. Therefore, it is possible to avoid the heat generation of the another solenoid-operated valve 9.

In the embodiment of the present invention, it is possible to selectively provide the closed state in which the secondary pressure of the pilot valve 22 is closed by deriving the OFF signal from the control circuit 28 to the air-supplying solenoid-operated valve 24 and the air-discharging solenoid-operated valve 26 respectively to maintain the pilot pressure, and the open state in which the secondary pressure of the pilot valve 22 is discharged to the outside via the discharge port 32 by deriving the OFF signal from the control circuit 28 to the air-supplying solenoid-operated valve 24 and deriving the ON signal to the air-discharging solenoid-operated valve 26 to decrease the pilot pressure.

Therefore, when the power supply source 34 is stopped, the user can select the closed state and the open state of the secondary pressure of the pilot valve 22 depending on, for example, the purpose of use. A specified example, in which the secondary pressure of the pilot valve 22 is closed, includes, for example, a case in which it is necessary to maintain a predetermined tension by using a fluid pressure-operated apparatus, and a case in which a slider of a vertically movable linear actuator is maintained at a predetermined height position.

Additionally, the embodiment of the present invention is advantageous in that it is possible to exclude the occurrence of temperature drift of the pressure sensor 30 by avoiding the heat generation of the air-discharging solenoid-operated valve 26.

What is claimed is:

1. A pressure control apparatus provided with a valve for controlling a secondary pressure in accordance with an action of a pilot pressure supplied by ON/OFF control of an air-supplying solenoid-operated valve and an air-discharging solenoid-operated valve, said pressure control apparatus comprising:

said air-supplying solenoid-operated valve for maintaining a valve-closed state when electric power application is stopped;

said air-discharging solenoid-operated valve for maintaining a valve-closed state when said electric power application is stopped;

a power source drop-detecting mechanism for detecting whether or not a power supply source is dropped to be lower than a predetermined value;

a power source-compensating mechanism for delaying drop of a solenoid-operated valve-driving power source for driving said air-discharging solenoid-operated valve when said power supply source is dropped; and a control mechanism for deriving an OFF signal to said air-supplying solenoid-operated valve and deriving an ON signal to said air-discharging solenoid-operated valve on the basis of a power source drop detection signal derived from said power source drop-detecting mechanism.

2. The pressure control apparatus according to claim 1, wherein said power source drop-detecting mechanism is composed of a power source-monitoring circuit, and said power source-monitoring circuit includes a comparator for making comparison to judge whether or not a voltage applied by said power supply source is dropped to be lower than a predetermined value.

3. The pressure control apparatus according to claim 1, wherein said power source-compensating mechanism is composed of a power source-compensating circuit including an electrolytic capacitor for delaying drop of a solenoid-operated valve-driving voltage.

4. The pressure control apparatus according to claim 3, wherein said power source-compensating circuit includes a first DC/DC converter for converting a voltage applied from said power supply source into said solenoid-operated valve-driving voltage, a second DC/DC converter for further converting said solenoid-operated valve-driving voltage into a CPU-driving voltage, a first electrolytic capacitor for delaying drop of said voltage applied by said power supply source, a second electrolytic capacitor for delaying said drop of said solenoid-operated valve-driving voltage, and a diode for preventing said first and second electrolytic capacitors from electric discharge when supply of power source from said power supply source is cut off.

5. The pressure control apparatus according to claim 1, wherein a closed state in which said secondary pressure of said valve is closed by deriving OFF signals from said control mechanism to said air-supplying solenoid-operated valve and said air-discharging solenoid-operated valve respectively, and an open state in which said secondary pressure of said valve is released by deriving said OFF signal from said control mechanism to said air-supplying solenoid-operated valve and deriving an ON signal to said air-discharging solenoid-operated valve are provided in a selective manner.

6. The pressure control apparatus according to claim 1, further comprising a pressure sensor for detecting said secondary pressure of said valve and deriving an obtained detection signal to said control mechanism.

7. The pressure control apparatus according to claim 5, wherein said valve is provided with a discharge port for discharging said secondary pressure to be supplied to a fluid pressure-operated apparatus to the outside.

* * * * *